(12) United States Patent
Chang et al.

(10) Patent No.: US 8,521,900 B2
(45) Date of Patent: Aug. 27, 2013

(54) REMOTE AUDIO-VIDEO SHARING METHOD AND APPLICATION PROGRAM FOR THE SAME

(75) Inventors: Kuo-Lung Chang, New Taipei (TW); Hsing-Yung Wang, New Taipei (TW); Meng-Chung Hung, New Taipei (TW); Kuan-Yu Chou, New Taipei (TW); Chen-Way Lu, New Taipei (TW); Chin-Jung Fan, New Taipei (TW)

(73) Assignee: Awind Inc., New Taipei (TW)

( * ) Notice: Subject to any disclaimer, the term of this patent is extended or adjusted under 35 U.S.C. 154(b) by 365 days.

(21) Appl. No.: 13/101,200

(22) Filed: May 5, 2011

(65) Prior Publication Data

US 2012/0284650 A1 Nov. 8, 2012

(51) Int. Cl.
*G06F 15/16* (2006.01)

(52) U.S. Cl.
USPC .......................................... 709/231; 709/207

(58) Field of Classification Search
USPC ................................................ 709/207, 231
See application file for complete search history.

(56) References Cited

U.S. PATENT DOCUMENTS

2006/0282855 A1* 12/2006 Margulis ........................ 725/43

* cited by examiner

*Primary Examiner* — Asghar Bilgrami
(74) *Attorney, Agent, or Firm* — Chun-Ming Shih; HDLS IPR Services

(57) ABSTRACT

A remote audio-video sharing method and an application program for the same are provided. The method comprises a content provider device capturing screen frames and sounds of the content provider device. First encoding and second encoding are executed on the captured screen frames and sound to transmit to and play on a content displayer device and a content controller device. The content displayer device receives, decodes the data and smoothly plays the received data. The content controller device receives, decodes the data and plays the received data in synch with the content provider device. Additionally, a control command is generated by the content controller device to reply to the content provider device to manipulate operations of the content provider device.

12 Claims, 4 Drawing Sheets

REMOTE AUDIO-VIDEO SHARING METHOD AND APPLICATION PROGRAM FOR THE SAME

BACKGROUND OF THE INVENTION

1. Field of the Invention

The present invention relates to a remote audio-video data sharing method, in particular, the invention relates to a method to enable remote audio-video sharing and controlling using three electronic devices connected via network, one of the electronic devices captures audio-video data and shares the same to the other two electronic devices, and a user can watch and control shared contents at ease.

2. Description of Prior Art

Since the invention of computers, powerful processing capabilities were utilized to make life more convenient and computers became popular devices in everyday life. Computers are used to process routine tasks in life and improve work efficiency.

Also, computers are widely applied in entertaining utilities such as establishing connections to Internet, game playing and watching films. Accordingly, expert skilled in the art developed various technologies to expand the entertaining functions delivered by computers.

For example, most users have the habit watching films on the televisions having large size screens. Though, it is convenient to play films with computers, computer systems are usually located in study rooms and frequently the screen size of the computer systems are smaller than household televisions and the resolution of computer systems is lower. As a result, many wired and wireless methods of audio-video data transmission were proposed attempting to transmit audio-video data of screen frames and sounds from computers to televisions so as to play the films on larger screens.

Remote audio-video share systems are now widely adopted in communication and multimedia applications, users are adopting said remote audio-video share system to share his or her computer' screen to a large sized television to watch video or surf Internet. In addition to see high quality audio-video data on the large sized television, user also needs to perform adequate control over his or her computer, such as typing web site URLs, selecting and opening video files to play, seeking the video file to certain position such as fast forward, and adjusting sound volumes.

Lots of remote audio-video share systems have been proposed, but none of them provide an easy access to perform such control. Respecting to prior art, the user has to use peripheral devices, such as a wireless keyboard or mouse to perform adequate control, the peripheral devices must be physically connected to the shared computer via USB/PS2 cables, or wirelessly connected to the shard computer via infrared rays, Bluetooth or radio signals. These connection ways limit the locations between the computer and the television, and is very inconvenient for user lying on a couch with a relaxed position.

Therefore, a progressive invention is needed to provide an easy access for the remote audio-video share systems to perform adequate control over the computer which sharing audio-video data. Also, a progressive method to optimize both sharing and controlling on the remote audio-video share system is further needed.

SUMMARY OF THE INVENTION

The primary objective of the present invention is to provide a remote audio-video sharing method and an application program for the same. The method comprises capturing screen frames and sounds of a content provider device (CPD), and performing encoding of different parameters according to the different manipulating demands required when watching films. The encoded data is transmitted respectively to a content displayer device (CDD) and a content controller device (CCD) to allow the user watching the film with the CDD at ease and manipulating with the CCD.

The CPD, for example a desktop PC or a notebook computer, captures audio and video data, encodes captured audio and video data with different parameters, and sends the encoded data to the CDD and the CCD respectively. The CDD, for example a television or a projector, is capable of decoding the encoded data and providing a large sized screen to display. The CDD receives the encoded data, then decodes and plays decoded data. The CCD, for example a smart device such as smart phone or tablet computer, generates control commands as user interacts with its human-machine interfaces, such as touch screens or physical buttons. At the same time, the CCD also receives the encoded data, then decodes and plays decoded data when necessary.

In order to achieve the above objective, the CPD captures screen frames and sounds of the CPD. The first encoding and the second encoding are performed on the captured screen frames and sounds for the CPD. The encoded data are transmitted to and played on the CDD and the CCD. The CDD, decodes and plays the data smoothly. The CCD receives, decodes and plays the data in synch with, the CPD. Also, control commands are generated by CCD, and replied to the CPD in order to manipulate operations of the CPD. In addition, when control commands are generated, the CPD dynamically adjusts the parameters the first encoding and the second encoding. Thus, users are allowed to watch films and manipulate the data, and optimize the encode/decode cost of the CPD, the CDD and the CCD.

Compare with prior art, the advantages achieved by the present invention include the CPD (such as a computer) captures screen frames and sounds of the CPD, and encodes the captured screen frames and sounds with encoding of high resolution and high frame rate for the CDD used for watching films as well as reserves larger buffer during data transmission. Thus, the CDD e receives and decodes the data more smoothly also the film resolution is high which is easier to watch to a user. Additionally, the CPD is used for manipulating the CCD to perform encoding of low resolution and low frame rate, as well as reserve smaller buffer during data transmission. Thus, the CCD receives, decodes the data and plays the screen frames and sounds in synch with film playing speed of the CPD. The user is allowed to manipulate the CPD easily with the CCD.

Traditionally, if users would like to have high resolution and smooth film playing at the electronic device of the receiving-end when executing remote audio-video streaming application, encoding of high bitrate and a larger buffer during data transmission are required. If the user prefers to speed up manipulating process at the electronic device of the receiving-end, encoding of low bitrate is required and a buffer during data transmission is not needed. Because low latency delivers the user experience of what you see is what you get and makes it easier to manipulate the data. Nonetheless, the technical means to accomplished the above two different objectives are in conflicts according to the prior art. The present invention is useful in overcome such disadvantage.

Further, the CPD dynamically adjusts the parameters of the first encoding and the second encoding according to that if the control event of the CCD occurs. Thus, the overhead for performing two different coding at the CPD is lowered. Also, when the user is watching the film and no control events occur at CCD during a predetermined period, the parameters of the first encoding and the second encoding are dynamically adjusted so as to save the bandwidth and the electricity consumed at the CCD for decoding.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to preferred embodiments, being not used to limit its executing scope. Any equivalent variation and modification made according to appended claims is all covered by the claims claimed by the present invention.

Figure 1:
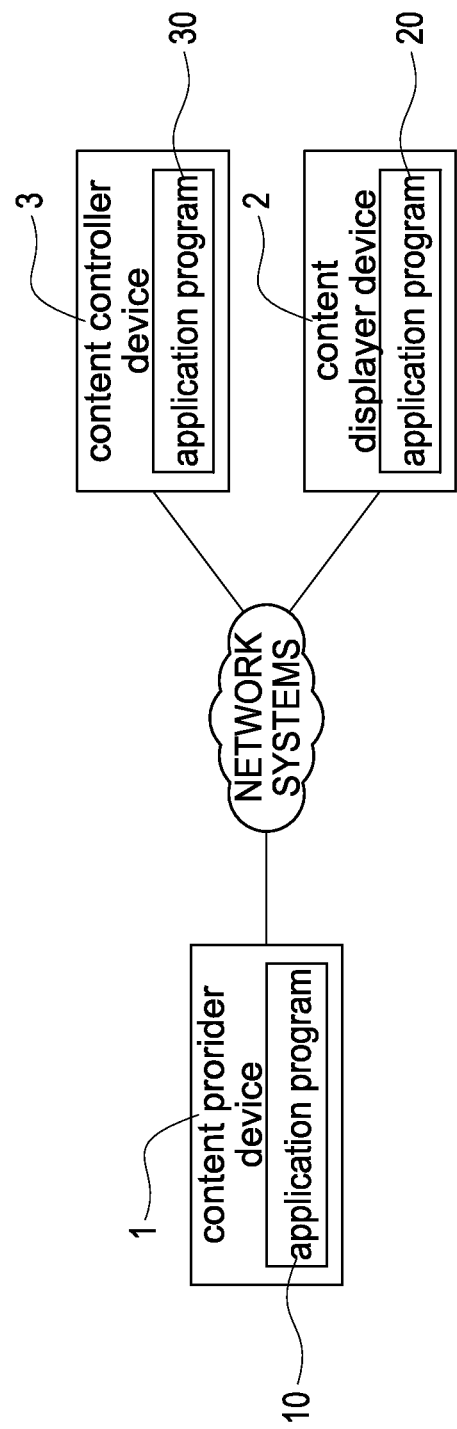
FIG. 1 is an architecture diagram of a prior art wireless security system.

FIG. 1 is a block diagram of a preferred embodiment according to the present invention. As shown in the diagram, the remote audio-video sharing method of the present invention is implemented with a content provider device 1, a content displayer device 2 and a content controller device 3 (referred as the CPD 1, the CDD 2 and the CCD 3). Application programs 10, 20 and 30 are saved respectively in the CPD 1, the CDD 2 and the CCD 3. When the application programs 10, 20, 30 are executed, the CPD 1, the CDD 2 and the CCD 3 establish interconnections via network systems.

Each application program 10, 20, 30 is respectively installed in the CPD 1, the CDD 2 and the CCD 3 via network downloading or other means of transmission and saved in the CPD 1, the CDD 2 and the CCD 3. When the CPD 1, the CDD 2 and the CCD 3 respectively load and execute the application programs 10, 20, 30, the CPD 1, the CDD 2 and the CCD 3 are interconnected for performing the remote audio-video sharing method of the present invention. In the embodiment, the CPD 1, the CDD 2 and the CCD 3 are connected via network systems in compliance with standards such as Wireless Fidelity (Wi-Fi) but the scope of the present invention is not limited thereto.

The application program 10 in the CPD 1 is an application program to execute at a transmitting-end. The CPD 1 captures screen frames and sounds of the transmitting-end device via the application program 10, and the captured screen frames and sounds are encoded and transmitted. In details, the CPD 1 simultaneously encodes the data with higher resolution and higher latency delay and lower resolution, lower latency delay and respectively transmits encoded data to the CDD 2 and the CCD 3 via the application program 10 based on performance of the CDD 2 and the CCD 3.

The application program 20 in the CDD 2 and the application program 30 in the CCD 3 is an application program used at a receiving-end. The CDD 2 and the CCD 3 respectively receive the transmitted data from the CPD 1 via the application programs 20 and 30. Then, the received data is decoded and played.

The CDD 2 is used for watching films. As a result, the CDD 2 receives data encoded with higher resolution and higher latency delay. The CCD 3 is used for manipulating the CPD 1. As a result, the CCD 3 is used for receives data encoded lower resolution and lower latency delay.

Figure 2:
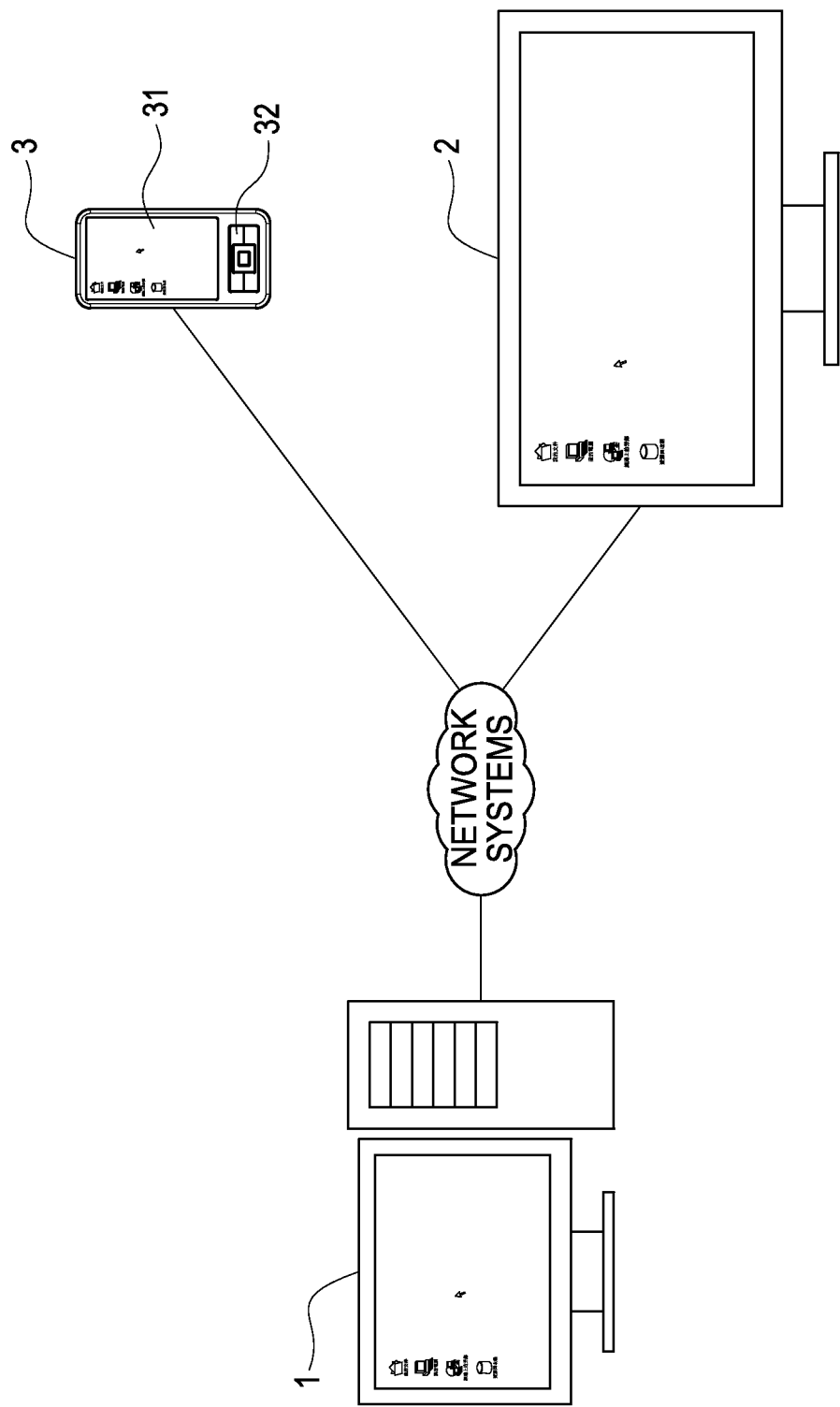
FIG. 2 is a system architecture diagram of a preferred embodiment according to the present invention.
Figure 3:
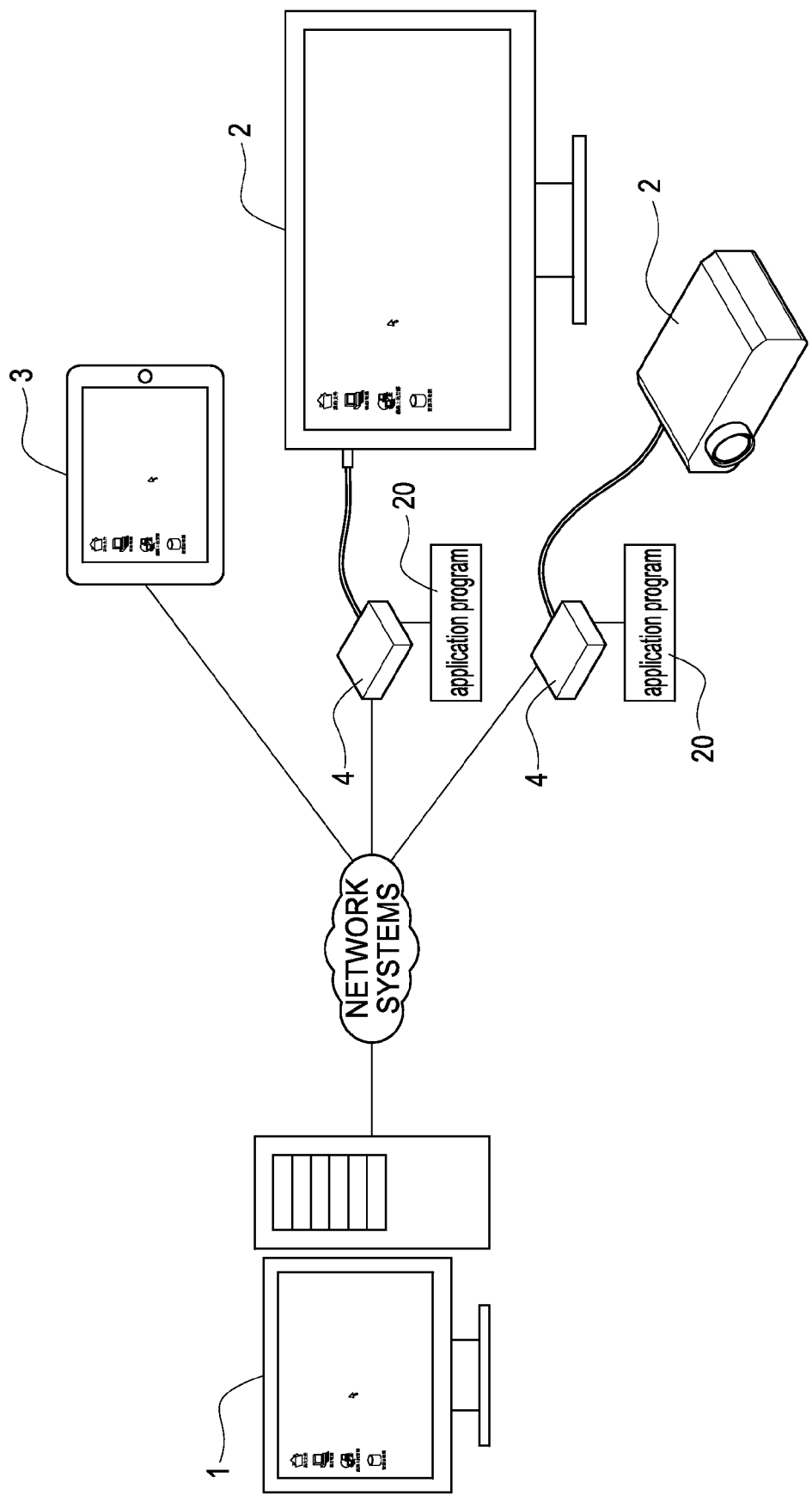
FIG. 3 is a flow chart of a preferred embodiment according to the present invention.

Referring to FIG. 2 and FIG. 3, FIG. 2 is an architecture schematic diagram of a preferred embodiment according to the present invention and FIG. 3 is another architecture schematic diagram of a preferred embodiment according to the present invention. The CPD 1 is a computer and control internal operations via an external hardware device such as a keyboard and a mouse (shown in the diagram). The CDD 2 has a display of large screen size such as a television or a projector etc. In addition, if the CDD 2 is a smart television, then the application program 20 can be loaded to and executed directly in the CDD 2.

On the other hand, if the CDD 2 is a display device without processing capabilities such as a traditional television or a projector as shown in FIG. 3, the CDD 2 is required to connect to an external expansion connection device 4. The application program 20 is installed and executed in the expansion connection device 4. In addition, the expansion connection device 4 is electrically connected to the CDD 2 via signal cables such as High Definition Multimedia Interfaces (HDMI) or AV connectors. The expansion connection device 4 receives the transmitted data from the CPD 1. The transmitted data is decoded and then, the screen frames and sounds generated by the data decoding are transmitted to and played on the CDD 2.

The CCD 3 is a handheld electronic device such as a smart phone and a tablet computer. The CCD 3 has a touch screen 31, and optionally the CCD 3 may has physical keys 32. The screen size of the CDD 2 is larger than the screen size of the touch screen 31 on the CCD 3.

The CDD 2 and the CCD 3 both receive and display the screen frames and sounds from the CPD 1. Also, the CDD 2 has a screen of larger screen size and is capable of smoothly playing the screen frames and sounds with higher resolution. The CCD 3 has a smaller touch screen and plays the screen frames and sounds with resolution and lower latency delay to be in synch with the CPD 1. Thus, a user is allowed to manipulate the CPD 1 simultaneously and directly with the physical keys 32 on the touch screen 31. In details, the screen frames and sounds of the CPD 1 can be played on the CDD 2 and the CCD 3 yet the purposes are different and the received data are processed with different encoding means.

Figure 4:
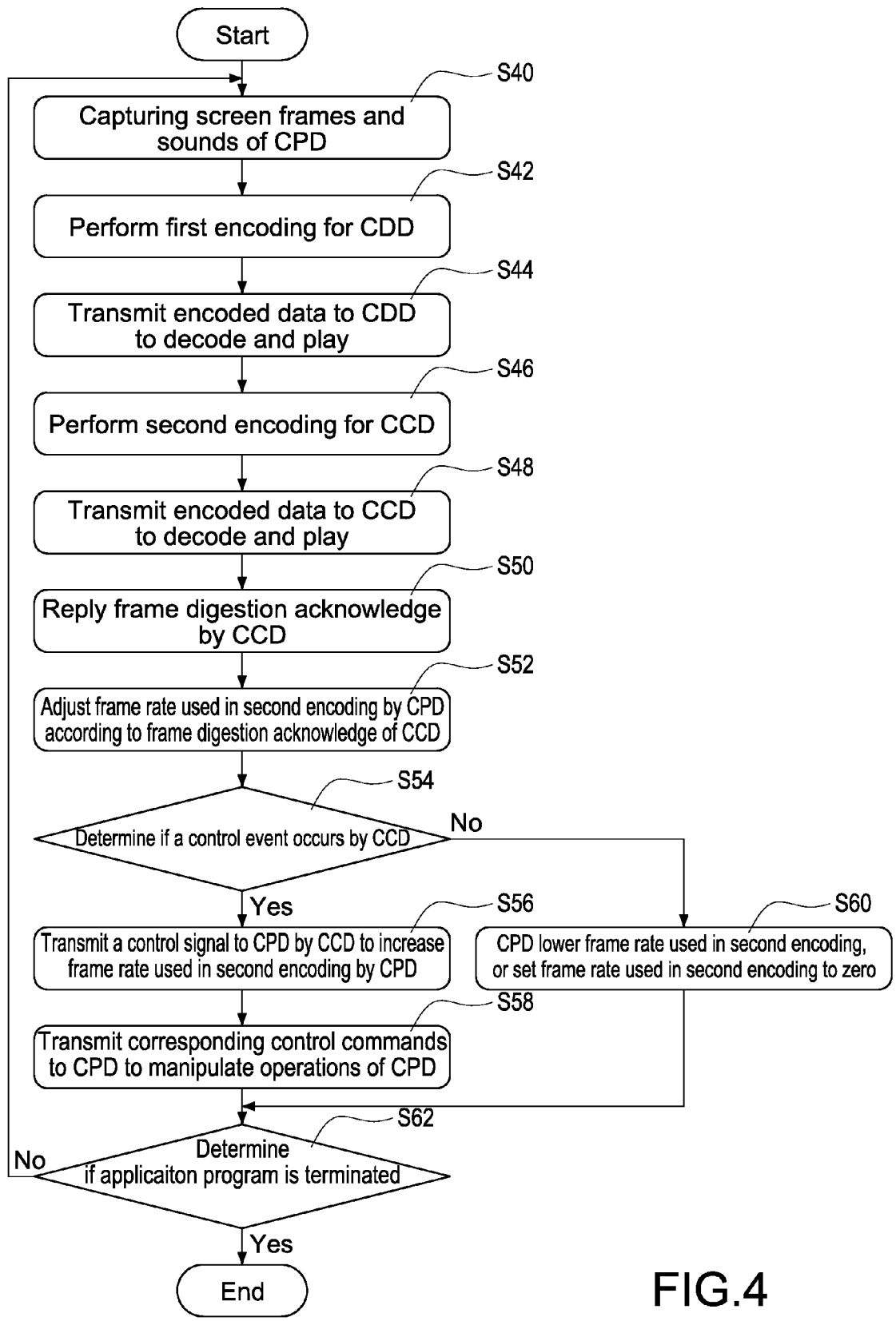
FIG. 4 is a flow chart of another preferred embodiment according to the present invention.

FIG. 4 is a flowchart of a preferred embodiment according to the present invention. Firstly, the CPD 1 captures the screen frames and sounds of the CPD 1 via the application program 10 (step S40). Next, the CPD 1 performs a first encoding for the CDD 2 via a encoder (not shown), (step S42). Additionally, the encoded data is transmitted to, decoded and played on the CDD2 (step S44). Next, the CPD 1 performs a second encoding for the CCD 3 via the encoder, (step S46). The encoded data is transmitted to, decoded and played on the CCD 3 (step S48). The step S44 is executed after the step S42. The step S48 is executed after the step S46. However, the step S42 and the step S46 can be executed independently or optionally the step S46 executed before S48 and the scope of the present invention is not limited thereto.

It should be noted that encoding parameters used in the above first encoding and the second encoding are different. The encoding parameters of the first encoding are set based on the CDD 2 for watching films with higher resolutions and higher frame rates, such as 30 frames per second (fps). In addition, the CDD 2 reserves a large buffer during data transmission. Using a larger buffer is used for overcome asynchronous audio-video data playing such as stop frame and fragmented frame caused by wireless signal interference when audio-video data of high quality, and high bitrate is transmitted wirelessly. Typically, the CDD 2 has sufficient processing power for performing decoding of the received data with high bitrate and smoothly playing the decoded data with high resolution in order to make the film watching convenient and pleasant to a user.

The decoding processing power of the CCD 3 typically is smaller than the CDD 2. The encoding parameters of the second encoding are set with lower resolution and lower frame rate for the CCD 3 in order to perform manipulating tasks. When transmitting data, the CCD 3 reserves a smaller buffer (optionally to set buffer as zero), the CCD 3 has low latency delay. Accordingly, the CCD 3 receives and decodes and plays the data in synch with playing speed of the screen frames and sounds of the CPD 1 as a result of the low latency delay and the display performance is maintained as "what you see is what you get". Thus, users can easily manipulate the CPD 1 via the CCD 3.

As mentioned above, the frame rate used in the first encoding is higher than the frame rate used in the second encoding, and the resolution used in the first encoding is higher than the resolution used in the second encoding. Further, when the CPD 1 transmits the data, the reserved buffer of the CDD 2 is larger than the reserved buffer of the CCD 3.

Following the step S48, the CCD 3 replies internal frame digestion acknowledge to the CPD 1 (step S50). Thus, the CPD 1 adjusts the frame rate used in the second encoding according to the frame digestion acknowledge replied by the CCD 3 (step S52). The CCD 3 of the present invention is a handheld electronic device, and the processing performance of the handheld electronic device is not as powerful as a smart television or the expansion connection device 4. As a result, the purpose of the step S52 is determining the processing speed and progress of the CCD 3 so as to assure film playing at the CCD 3 is in synch with the CPD 1 and the display performance is maintained as "what you see is what you get".

Next, the CCD 3 determines if a control event occurs (step S54). If yes, the CCD 3 simultaneously transmits a control signal to the CPD 1 to instruct the CPD 1 to increase the frame rate used in the second encoding and facilitate user manipulating the CCD 3 (step S56). It should be noted that performing two different encoding tasks at the same time results in high overhead to the CPD 1. In the step S56, the parameters of the first encoding and the second encoding are dynamically adjusted according to that if a control event occurs at the CCD 3. Thus the CPD 1 optimizes the performance of the CCD 3 and balances with lowering the performance of the CDD 2. The overhead required for performing two different encoding at the CPD 1 is lowered. Nonetheless, the above embodiments are preferred embodiments of the present invention and should not limit the scope of the present invention.

Following the step S56, the CCD 3 transmits a corresponding control command to the CPD 1 to manipulate operations of the CPD 1 (step S58). In details, when the touch screen 31 or the physical keys 32 on the CCD 3 is triggered, it is determined that a control event occurs. In the step S58, the CCD 3 captures absolute coordinates or relative coordinates on the touch screen 31 to transmit to the CPD 1. The captured absolute coordinates are converted to a mouse control command of the CPD 1. Also, the CCD 3 scans the keyboard codes of the physical keys 32 or scans the input Unicode word string of the touch screen 31 or of the physical key 32 to transmit to the CPD 1. The scanned keyboard codes are converted to the keyboard control command of the CPD 1. Nonetheless, the above embodiments are preferred embodiments of the present invention and should not limit the scope of the present invention.

If no control event occurs at the CCD 3 during a predetermined period in the step S54, the CPD 1 lowers the frame rate used in the second encoding, or sets the frame rate used in the second encoding as zero (step S60). In derails, the CCD 3 typically has lower processing power and uses batteries as power source. Long data transmission and decoding operation occupies large amount of transmission bandwidth and consumes large amount of power in the CCD 3. The purpose of the step S60 is to dynamically adjust the parameters of the first encoding and the second encoding in order to lower the overhead required for performing two different encoding at the CPD 1 and saves the transmission bandwidth used as well as the power consumption used by decoding at the CCD 3.

In the remote audio-video sharing method of the present invention, the CPD 1, the CDD 2 and the CCD 3 establish interconnection via executing the application program 10, 20 and 30. In details, the application programs 10, 20 or 30 are executed to search for the IP address of other application program for establishing connections in compliance with WIFI standards and transmitting data among each other.

The CPD 1, the CDD 2 and the CCD 3 determine if each application programs 10, 20 and 30 are terminated at all times (step S62). The interconnections are disconnected when any of the application programs 10, 20 and 30 is terminated. At the same time, the remote audio-video sharing method of the present invention ends. In details, when the application program 10 is terminated, the CPD 1 disconnects the connections with the CDD 2 and the CCD 3. When the application program 20 is terminated, the CDD 2 disconnects the connection with the CPD 1 but the connection between the CPD 1 and the CCD 3 continues to operate. When the application program 30 is terminated, the CCD 3 disconnects the connection with the CPD 1, but the connection between the CPD 1 and the CDD 2 continues to operate.

If the application programs 10, 20 and 30 operate normal, the method moves back to the step S40, the CPD 1 continues to capture screen frames and sounds of the CPD 1 to transmit to and play at the CDD 2 and the CCD 3, as well as receive the control command from the CCD 3.

As the skilled person will appreciate, various changes and modifications can be made to the described embodiments. It is intended to include all such variations, modifications and equivalents which fall within the scope of the invention, as defined in the accompanying claims.

What is claimed is:

1. A remote audio-video sharing method used with a content provider device, a content displayer device and a content controller device, wherein an application program was respectively saved and executed in the content provider device, the content displayer device and the content controller device for establishing interconnections between the devices via the application program, the remote audio-video sharing method comprising:
   a) capturing screen frames and sounds of the content provider device at the content provider device;
   b) performing first encoding on the captured screen frames and sounds for the content displayer device;
   c) following step b, transmitting the encoded data to the content displayer device to decode and play;
   d) performing second encoding on captured screen frames and sounds for the content controller device, wherein encoding parameters of the second encoding are different from encoding parameters of the first encoding;

e) following step d, transmitting the encoded data to the content controller device to decode and play;

f) replying frame digestion acknowledge to the content provider device by the content controller device;

g) following step f, adjusting the frame rate used in the second encoding by the content provider device according to the frame digestion acknowledge of the content controller device;

h) determining if a control event occurs by the content controller device;

i) following step h, transmitting a control signal to the content provider device by the content controller device to increase frame rate used in the second encoding by the content provider device if a control event occurs; and j) following step i, transmitting corresponding control commands to the content provider device by the content controller device according to the control event to manipulate operations of the content provider device.

2. The remote audio-video sharing method of claim 1, wherein further comprising a step k: following step h, if no control event occurs in the content controller device within a predetermined period, the content provider device lowers the frame rate used in the second encoding, or sets the frame rate used in the second encoding to zero.

3. The remote audio-video sharing method of claim 1, wherein the content controller device is a handheld electronic device and has a touch screen, and the step h is determining if a control event occurs when the touch screen is triggered.

4. The remote audio-video sharing method of claim 3, wherein the content controller device captures absolute coordinates or relative coordinates on the touch screen to transmit to the content provider device and to convert to mouse control commands of the content provider device in the step j.

5. The remote audio-video sharing method of claim 3, wherein the content controller device further has a physical key, the content controller device scans keyboard code of the physical key, or captures Unicode word string input with the touch screen or the physical key to transmit to the content provider device and to convert to keyboard control commands of the content provider device in the step j.

6. The remote audio-video sharing method of claim 1, wherein screen size of the content displayer device is larger than the screen size of the content controller device.

7. The remote audio-video sharing method of claim 1, wherein the frame rate used in the first encoding is larger than the frame rate used in the second encoding, the resolution used in the first encoding is larger than the resolution used in the second encoding.

8. The remote audio-video sharing method of claim 7, wherein the frame rate used in the first encoding is 30 frames per second.

9. The remote audio-video sharing method of claim 1, wherein the content provider device, the content displayer device and the content controller device establish interconnections via Wireless Fidelity (Wi-Fi) compliant technologies.

10. The remote audio-video sharing method of claim 9, wherein the reserved buffer of the content displayer device is larger than the reserved buffer of the content controller device when the content provider device transmits data.

11. The remote audio-video sharing method of claim 10, wherein the reserved buffer of the content controller device is zero to generate low latency delay of the content controller device to be in synch with the content provider device.

12. An application program installed in an electronic device, when the application program is loaded and executed in a plurality of electronic devices, the plurality of electronic devices are interconnected for executing a remote audio-video sharing method, wherein the a plurality of electronic devices comprising a content provider device, a content displayer device and a content controller device, the remote audio-video sharing method comprising:

a) capturing screen frames and sounds of the content provider device at the content provider device;

b) performing first encoding on the captured screen frames and sounds for the content displayer device;

c) following step b, transmitting the encoded data to the content displayer device to decode and play;

d) performing second encoding on captured screen frames and sounds for the content controller device, wherein the encoding parameters of the second encoding are different from the encoding parameters of the first encoding;

e) following step d, transmitting the encoded data to the content controller device to decode and play;

f) replying frame digestion acknowledge to the content provider device by the content controller device;

g) following step f, adjusting the frame rate used in the second encoding by the content provider device according to the frame digestion acknowledge of the content controller device;

h) determining if a control event occurs by the content controller device;

i) following step h, transmitting a control signal to the content provider device by the content controller device to increase frame rate used in the second encoding by the content provider device if a control event occurs; and j) following step i, transmitting corresponding control commands to the content provider device by the content controller device according to the control event to manipulate operations of the content provider device.

* * * * *